(No Model.)  3 Sheets—Sheet 1.

T. PRESSLY.
POISON DISTRIBUTER.

No. 434,357.  Patented Aug. 12, 1890.

Witnesses:  Inventor:
Thompson Pressly,
By his Attorney,
J. R. Little (No Model.) 3 Sheets—Sheet 2.
T. PRESSLY.
POISON DISTRIBUTER.
No. 434,357. Patented Aug. 12, 1890.
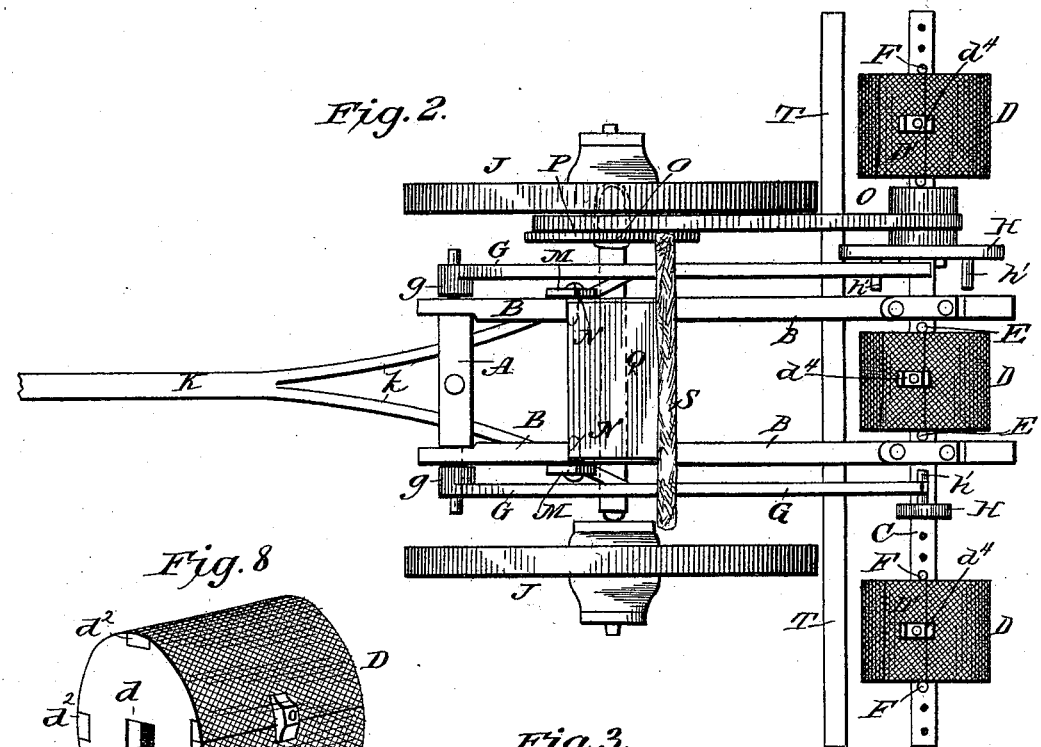
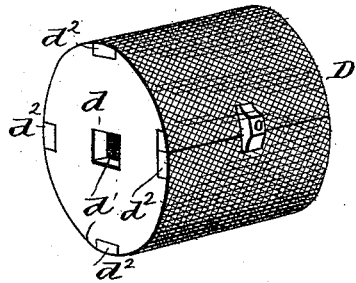
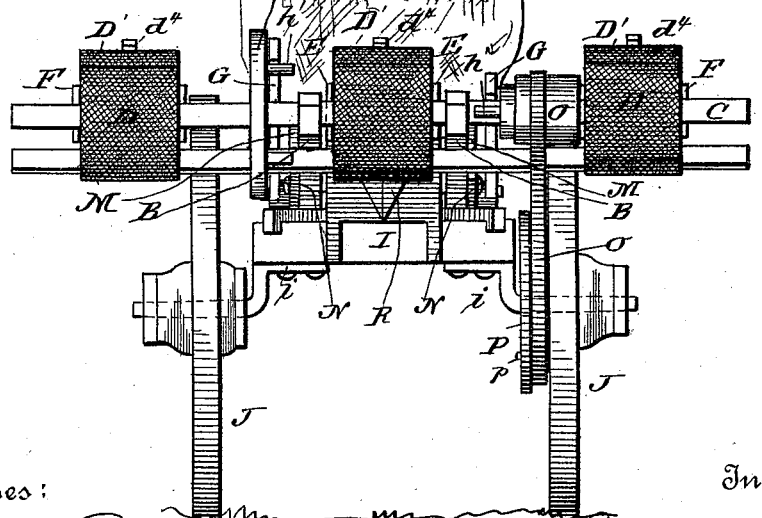
Witnesses:
Wm J. Littell,
Jean Ellen Shields
Inventor:
Thompson Pressly,
By his Attorney,
J. R. Littell (No Model.) 3 Sheets—Sheet 3.
T. PRESSLY.
POISON DISTRIBUTER.
No. 434,357. Patented Aug. 12, 1890.
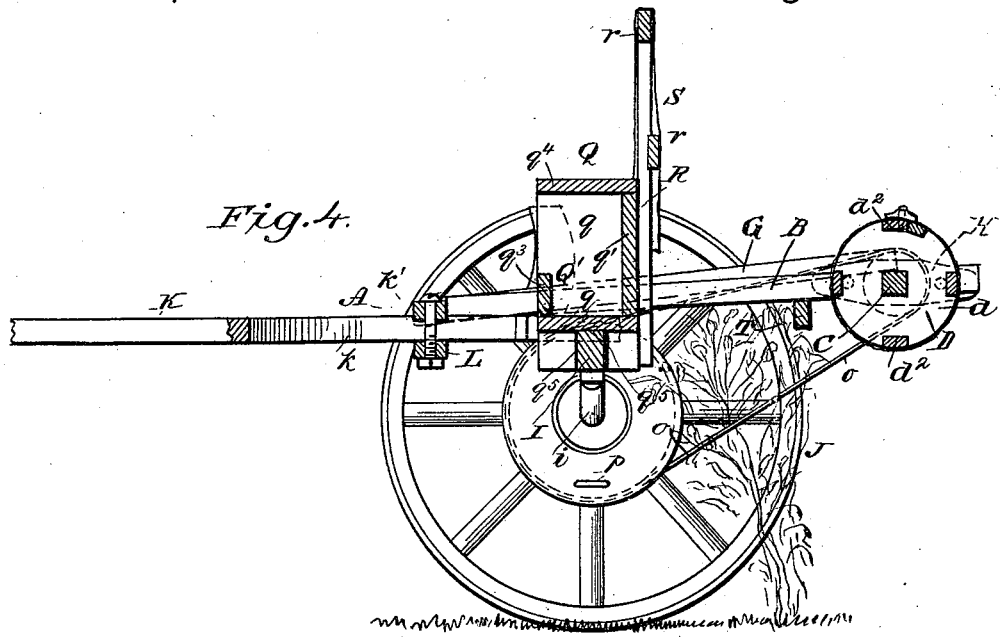
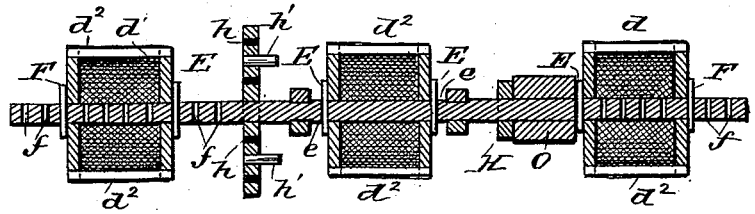
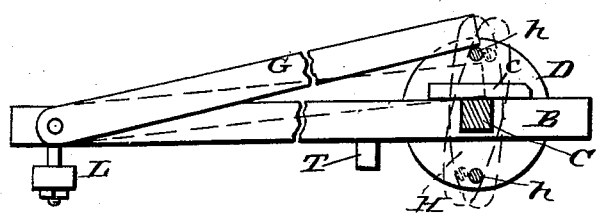
Witnesses:
Wm. J. Littell,
J. Van Allen Shields.
Inventor
Thompson Pressly,
By his Attorney,
J. R. Littell.

UNITED STATES PATENT OFFICE.

THOMPSON PRESSLY, OF SWEET HOME, TEXAS.

POISON-DISTRIBUTER.

SPECIFICATION forming part of Letters Patent No. 434,357, dated August 12, 1890.

Application filed December 20, 1889. Serial No. 334,417. (No model.)

*To all whom it may concern:*

Be it known that I, THOMPSON PRESSLY, a citizen of the United States, residing at Sweet Home, in the county of Lavaca and State of Texas, have invented certain new and useful Improvements in Devices for Destroying Cotton-Worms; and I do hereby declare that the following is a full, clear, and exact description of the invention, which will enable others skilled in the art to which it appertains to make and use the same.

This invention relates to devices for destroying cotton-worms of that class embodying rotatable foraminated cylinders adapted to contain suitable powder-poison, which is sifted or dusted therefrom during rotation.

The object of the invention is to provide a device of this character in which the cylinders are adapted to be both vertically and laterally adjustable with respect to the height of the cotton and width of the rows.

A further object of the invention is to provide mechanism for jarring the cylinders, whereby a more perfect feed of the poison is attained.

A further object of the invention is to produce a device of this character which possesses advantages in point of simplicity, inexpensiveness, durability, and general efficiency.

Figure 1:
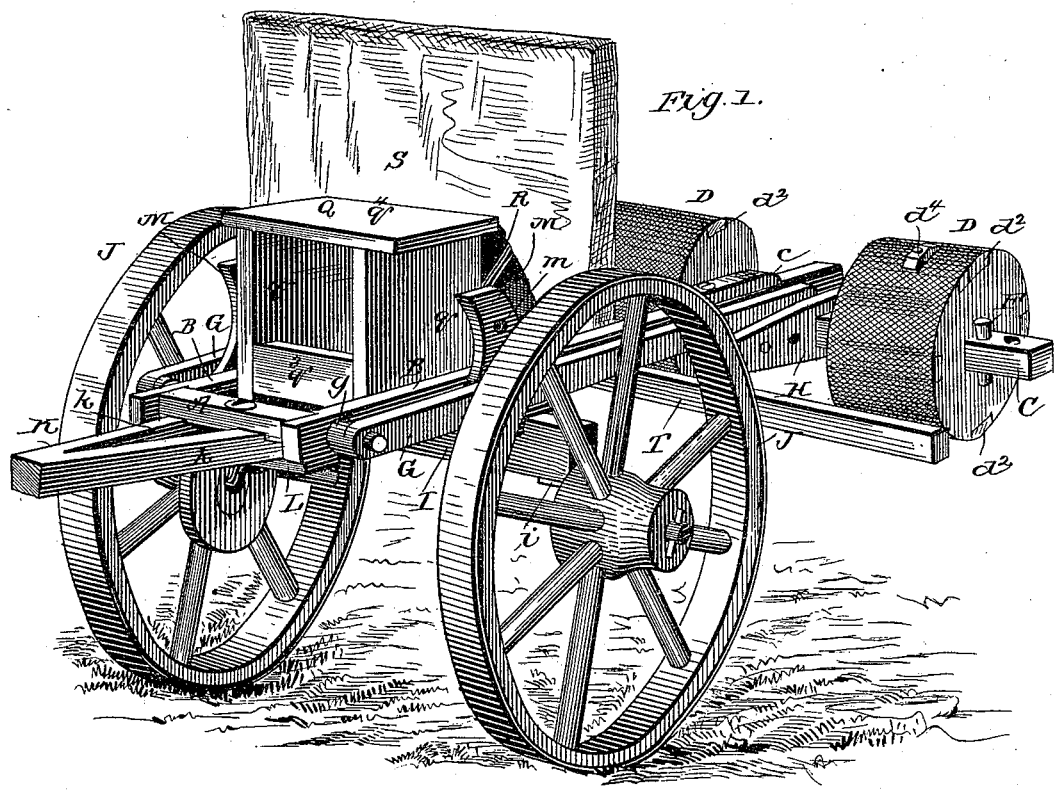
Figure 5:
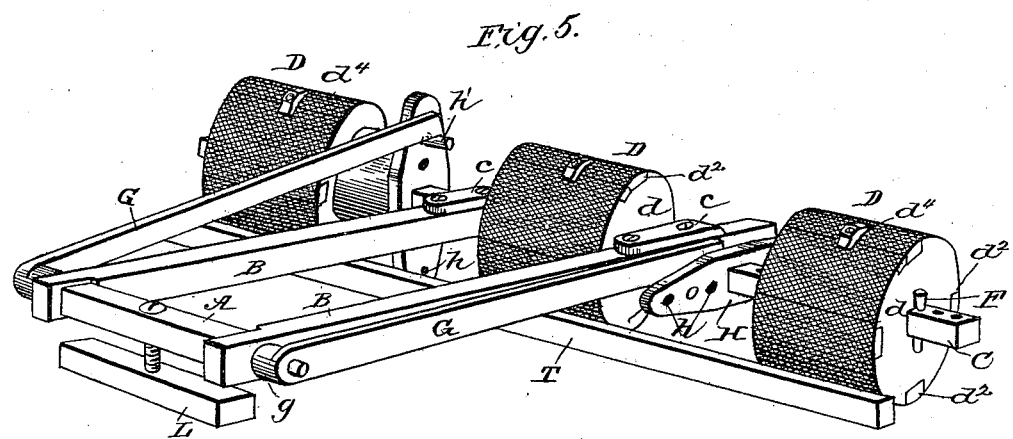

In the drawings, Figure 1 is a perspective view of a poison-duster embodying my invention. Fig. 2 is a top or plan view. Fig. 3 is a rear end elevation. Fig. 4 is a vertical longitudinal sectional view. Fig. 5 is a detail perspective view of the dusting device removed from the carriage. Fig. 6 is a longitudinal sectional view taken through the cylinder-shaft and cylinders. Fig. 7 is a side elevation of the dusting device, illustrating the operation of the jarring mechanism, parts being broken away. Fig. 8 is a detail perspective view of one of the cylinders or drums removed.

Corresponding parts in the figures are denoted by the same letters of reference.

Referring to the drawings, A designates a rigid transverse beam, to which is pivotally connected the front ends of two rearwardly-projecting parallel longitudinal beams B B. At or near the rear ends of the latter are provided bearings $c$ $c$ for an elongated transverse shaft C, said shaft being rectangular in cross-section.

Upon the shaft C are mounted a series of cylinders or drums D, the central one of which, located between the beams B, is rigidly retained in place by pins E E, engaging perforations $e$ $e$, provided transversely through the shaft C at each side of the cylinder or drum. The remaining cylinders or drums are disposed upon the outer portions of the shaft, and are adjustable thereon to adapt the cylinders or drums to accord with the width of the rows of cotton. To permit of the adjustment of these cylinders, the shaft is provided at each side thereof with a series of transverse perforations $f$, one of which is engaged by a pin F F to retain the cylinder in adjusted position. I have herein shown the device as provided with three cylinders, though it will be obvious that any desired number may be used.

The cylinders or drums each comprise two corresponding circular heads $d$ $d$, provided centrally with rectangular openings $d'$ $d'$, corresponding to and adapted to receive the shaft C. The heads $d$ are connected by a series of cross-pieces $d^2$ $d^2$, embedded therein, so as to be flush with the periphery of the same. Around the periphery of the cylinders or drums is secured a wire or loosely-woven cloth fabric $d^3$, completely enveloping the cylinders. A hinged door $D'$ is provided at the periphery of the cylinders, through which the latter are filled, the door being adapted to be held in locked position preferably by a turn-button $d^4$. By reason of the manner of mounting the cylinders upon the shaft it will be clearly seen that, while the former are capable of adjustment upon the latter, they are at all times rotated therewith.

In some instances it is necessary to effect a jarring of the cylinders or drums to secure a proper feed of poison therefrom. To accomplish this, I have provided two arms G G, pivoted at their front ends to the ends of the beam A and projecting rearwardly therefrom. The front or bearing ends of these arms are provided with inwardly-projecting shoulders $g$ $g$, which bear against the beams B and retain the arms from contact therewith.

Upon the shaft C, adjacent the outer sides of the beams B, are mounted two corresponding cross-arms H H, arranged diametrically opposite each other. These arms are provided at each side the shaft with a series of perforations $h$, disposed longitudinally with relation to the arms, and in one of each series of perforations is secured a lug or pin $h'$, which, during the rotation of the shaft, are adapted to elevate the arms G and drop them upon the shaft, causing a slight jarring of the latter.

I will now proceed to describe the carriage which I prefer to employ in connection with my invention. It will, however, be obvious that I may employ any other adapted form of carriage in lieu of the following construction without departing from the spirit and scope of my invention.

I designates the axle, provided at its ends with depending spindles $i\ i$, upon which are mounted carrying-wheels J J. To the axle is secured a tongue K, having its rear end bifurcated, and the arms $k\ k$ formed thereby diverged, meeting the axle near its ends.

When the device is secured in position upon the above-described carriage, the beam A is seated in recesses $k'\ k'$, formed in the arms $k$ at their upper side, and said beam is retained therein by a similar beam L, disposed under the arms $k$ and bolted or otherwise secured to the beam A.

To effect the vertical adjustment of the cylinders or drums, I have provided two forwardly-projecting segmental arms M M, which are in the present instance secured to the arms $k$ of the tongue just in front of the axle, and from their secured ends the arms M project upwardly between the beams B and arms G. These segmental arms are each provided with a series of perforations $m$, one of each series being engaged by a pin N, disposed under the beams B to retain them in the elevated position to which they have previously been adjusted.

Motion is transmitted to the cylinder-shaft from one of the carrying-wheels through the medium of a belt O engaging a pulley $o$ on the shaft and a pulley P mounted on the hub of the adjacent carrying-wheel. The latter pulley consists of a flanged ring fitted over the inner end of the hub and rigidly secured in place by wires $p$ passed therethrough and secured around two or more spokes of the wheel. I have thus fully described the construction of this pulley, owing to its adaptation to other forms of carriages than that herein shown and described.

Q designates a seat comprising sides $q\ q$, back $q'$, bottom $q^2$, provided with an upwardly-projecting flange $q^3$ at its front edge, and the top $q^4$ forming a receptacle Q' for storing tools and an additional supply of poison. The seat is further provided with a back consisting of two upwardly-divergent arms R, to which are secured elongated cross-pieces $r$, the whole being covered by cloth S or other material designed to screen the operator from the poison when the device is in operation. With the present form of carriage the sides $q$ are recessed at their lower ends, as at $q^5$, and the seat is disposed between the beams B with the axle engaging said recesses.

For bending the cotton-stalks so that the leaves will be overturned and the poison deposited on the under side thereof, I have provided a transverse bar T, secured beneath the beams B in advance of the cylinder-shaft. This bar also serves to keep the cotton from contact with the cylinders, preventing wear of the same, and it also serves to keep the cylinders free from the moisture upon the cotton-leaves.

I claim as my invention—

1. In a device for destroying cotton-worms, the combination, with a stationary frame, of vertically-adjustable arms pivotally connected therewith, a shaft journaled at the ends of said arms and carrying adjustable foraminated cylinders or drums, and upwardly-projecting arms provided with perforations adapted to be engaged by pins for retaining the shaft-carrying arms in adjusted position, substantially as set forth.

2. In a device for destroying cotton-worms, the combination, with a rotatable shaft provided with foraminated cylinders or drums, and with revolving cross-arms having transversely-projecting lugs, of pivoted arms resting thereon and adapted to be elevated by said lugs and dropped upon the shaft to jar the same, substantially as set forth.

3. In a device for destroying cotton-worms, the combination, with a carriage provided with upwardly-projecting arms having series of perforations, of beams pivotally connected with the carriage and carrying at their rear ends a rotatable shaft provided with foraminated cylinders or drums and pins adapted to engage one of each series of perforations in said arms and disposed under the beams to retain them in elevated position, substantially as set forth.

4. In a device for destroying cotton-worms, the combination, with a carriage, of vertically-adjustable beams carrying a rotatable shaft at their outer ends provided with foraminated cylinders or drums, revolving cross-arms on said shaft provided with opposing lugs and arms pivotally mounted on the carriage and adapted to be elevated by said lugs and dropped behind the same upon the shaft to jar the latter, substantially as set forth.

5. The combination, with a rotatable shaft, rectangular in cross-section and provided at points thereon with perforations, of cylinders or drums comprising heads provided with rectangular openings to receive said shaft, a foraminated peripheral covering, and pins adapted to engage one of each series of perforations at both sides the cylinders or drums, substantially as set forth.

6. The combination, with a carriage provided with upwardly-projecting perforated arms, of beams pivotally mounted on said carriage in front of the arms and carrying a shaft provided with foraminated cylinders or drums adjustable thereon, pins adapted to engage one of the perforations in each of the arms to retain the shaft in the position to which it has been elevated, arms pivotally mounted on the carriage and projecting rearwardly over the shaft, cross-arms on the latter diametrically opposite each other and provided with opposing lugs or pins adapted to alternately elevate the pivoted arms and drop them upon the shaft to jar the latter, and a seat provided with a screen, substantially as set forth.

7. In a device for destroying cotton-worms, the combination, with a rotatable shaft provided with foraminated cylinders or drums, of a transverse bar traveling in advance of said shaft adapted to bend the cotton-stalks and retain them from contact with the cylinders, substantially as and for the purpose set forth.

In testimony whereof I affix my signature in pressure of two witnesses.

THOMPSON PRESSLY.

Witnesses:
D. E. HICKS,
JOHN A. HARRISON.